United States Patent [19]
Kronstein et al.

[11] 4,056,494
[45] Nov. 1, 1977

[54] JOINT SUSPENSIONS OF MIXED PIGMENTATIONS ACHIEVED BY ACTIVE EFFECTS OF PLANT PHOSPHATIDES

[75] Inventors: Max Kronstein, Bronx, N.Y.; Joseph Eichberg, Atlanta, Ga.

[73] Assignee: American Lecithin Company, Atlanta, Ga.

[21] Appl. No.: 556,309

[22] Filed: Mar. 7, 1975

[51] Int. Cl.² .................. C09D 3/54; C09D 3/64; C09D 5/02
[52] U.S. Cl. .................. 260/22 A; 106/308 Q; 106/308 R; 260/29.2 E; 260/29.3; 260/37 R; 260/38; 260/40 R
[58] Field of Search ............ 260/22 A; 106/15 AF, 106/308 Q, 308 R

[56] References Cited

U.S. PATENT DOCUMENTS

| | | | |
|---|---|---|---|
| 2,201,064 | 5/1940 | Thurman | 260/403 |
| 2,465,733 | 3/1949 | Levis | 260/403 |
| 2,839,546 | 6/1958 | Davis | 260/403 |
| 2,997,398 | 8/1961 | Kronstein et al. | 106/14 |

OTHER PUBLICATIONS

Alexander, Colloid Chemistry Theoretical and Applied, vol. VI, Reinhold Publishing Corp., N.Y., N.Y., 1946, pp. 263–267, and 316–320.

*Primary Examiner*—Ronald W. Griffin
*Attorney, Agent, or Firm*—Virgil H. Marsh

[57] ABSTRACT

Coating compositions, such as, paints with mixed pigmentation containing pigment with widely different specific gravities, have the tendency to show in the pigment sedimentation a separation of the pigment components. Such separated components do not redisperse readily with the coating composition vehicle, upon shaking or mixing, to fully restore the initial color shades. The three factors of flotation, flocculation, and sedimentation cause the separation of the coating composition components. Plant phosphatides, which are referred to as lecithins, (and modified plant phosphatides) can be used as the only additive resulting in a joint sedimentation of the entire pigment mixture without separation of the pigment components from each other. As a result, on shaking or mixing, the entire pigmentation reenters the coating composition jointly, and the initial color shade of the coating composition is restored. The lecithin or modified lecithin is used in an amount between 3.2 to 8 percent based on the amount of pigment.

17 Claims, No Drawings

JOINT SUSPENSIONS OF MIXED PIGMENTATIONS ACHIEVED BY ACTIVE EFFECTS OF PLANT PHOSPHATIDES

BACKGROUND OF THIS INVENTION

1. Field of This Invention

This invention relates to the prevention of color variation in a coating composition, such as, a paint, wherein color is produced by a mixture of pigments having different densities, caused by the separation of the pigments during storage or drying of the coating composition.

2. Prior Art

In preparing and applying mixtures of powdered or crystalline substances (such as, pigments) having different physical properties (such as, different specific gravity or density or different oil absorption) dispersed in fluid media (such as, oils or resin solutions or other film-forming paint vehicles), it is essential not only to accomplish a uniform dispersion of the mixed components, but also to obtain a state where such dispersed solid mixtures no longer have a tendency to separate from each other during storage of the dispersions. This is necessary because such pigment mixtures, comprising components of different specific gravity or different oil absorption, (after having been dispersed in the vehicle) tend to separate upon storage again into the various components. Therefore a pair consisting of pigments of different specific gravity will generally separate again with the heaviest component settling to the bottom of the paint and the less heavy components settling out there above. Shaking the stored mixture (in the vehicle) will not cause the separated materials to fully redisperse. Where such pigments have a different color, their initial dispersion in the vehicle represented a paint of a special color. But after separation of the components and after an incomplete remixing of the different pigments, the resulting product will not have the same color shade as when it had been produced initially. In paint production such a change in color shade due to these factors is highly undesirable.

Pigments having a similar specific gravity might vary in other physical properties which interfere with their uniform dispersion in fluid vehicles — this will result in undesirable separations during storage of the dispersion. It might, for instance, be economically desirable to use a high priced colored pigment with the addition of a more economical colorless additive or "extender" pigment despite the fact that two such kinds of pigments might have widely different physical properties. For instance, a chemical pure zinc yellow might have a similar specific gravity as a wet ground mica extender pigment. But the oil absorption of the zinc yellow might be half that of the mica extender. In dispersing mixtures of both in an oil modified alkyd resin vehicle, the two pigments will widely differ in dispersion properties and in uniformity of application. The extender with its more incomplete dispersion in the oil based vehicle will settle out during storage and will not fully be redispersed with the other component under shaking or mixing. A different colorshade will be obtained and upon application a different reflectance will be obtained — both are not desirable.

The literature and industrial practice have suggested various ways of improving the tendency of mixed pigments to separate in dispersions. For instance, a number of synthetic "surfactants" have been suggested for use in the dispersion of pigmentations, such as non-ionic derivatives of fatty acid esters (like polyethylene glycol 400 mono oleate, or non-ionic sodium salts of sulfonic acid or others). A wide group of other chemical synthetic additives have been suggested with the aim of relieving the storage difficulties of the paints having mixed pigmentations. But all these represent chemicals which differ in their chemical nature from that of the dispersing coating vehicle and none are known to have fully succeeded in overcoming the problem of the separation of the pigment components in such dispersions.

In order to improve the stability of pigment mixtures in paints, the prior art defines pigment separation as the result of three factors: floating of light weight color components to the paint surface ("FLOTATION"), a renewed agglomeration of pigment particles due to poor pigment wetting ("FLOCCULATION") and the settling out of pigments according to the Strokes Law ("SEDIMENTATION"). Kress, Peter, Deutsche Farben Zeitung 24, 11, p. 521 (1970), teaches the following:

| TERM | FORMS OF PIGMENT SEPARATION AND MEANS FOR LIMITATION | |
|---|---|---|
| | DEFINITION | SUGGESTED MEANS OF LIMITATION |
| FLOTATION | THE FLOATING OF LIGHT WEIGHT COLOR COMPONENTS TO THE PAINT SURFACE | IMPROVE THE BONDING BETWEEN PIGMENT SURFACE AND BINDER BY A SOYALECITHIN (0.5 to 1.5% BASED ON THE VEHICLE.) |
| FLOCCULATION | RENEWED AGGLOMERATION OF PIGMENT DUE TO POOR PIGMENT WETTING. | REDUCE THE SURFACE TENSION OF THE BINDER BY A XYLENE SOLUTION OF A SILICONE OIL (0.5 to 1% BASED ON THE TOTAL VEHICLE). |
| SEDIMENTATION | SETTLING OUT, ACCORDING TO STOKES' LAW. | RESTRICT THE FREEDOM OF MOTION OF THE PIGMENT PARTICLES BY A BENTONE (2 TO 5% BASED ON THE VEHICLE. |

By way of review, the freedom of motion of the pigment particles is supposed to be restricted by the addition of a certain amount of Bentone and the surface tension of the binder is supposed to be reduced by incorporation of a silicone oil. A third additive (0.5 to 1.5 percent soya lecithin, based on the vehicle) is introduced in order to "improve the bonding between pigment surface and binder". Since none of the three additives is volatile, each of them remains a component in the applied and dry final paint coating even though each physical role is no longer required.

BROAD DESCRIPTION OF THIS INVENTION

An object of this invention is to provide a process for the prevention of color variation in paint, wherein color is produced by a mixture of pigments having different densities, caused by the separation of the pigments during storage or drying of the paint. Another object of this invention is to provide a composition to achieve the above object. Other objects and advantages are obvious from this application to one ordinarily skilled in the art.

The objects and advantages of this invention are achieved by this invention.

This invention approaches the problem of counteracting a separation of the components in a mixed pigmentation not as a result of a series of different factors, which would have to be overcome by individual additives, but as a single problem to achieve a joint sedimentation of all the components in a mixed pigmentation without allowing such solid components to separate from each other. Therefore, this invention does not acquire any reuniting afterwards, even when upon storage a gravitational joint-settling of the solid parts in the paint (the fluid vehicle) has occurred. Upon mixing or shaking, the joint sedimentation is dispersed again into the same condition that existed at the initial preparation of the suspension. This invention accomplishes such by the use of a certain amount of phosphatide which is produced from glycerin-fatty acid ester type-oil-producing plants and which is commonly known under the term of lecithin material. The lecithins are not used in this invention to improve the bonding between pigment surfaces and binders, as has been recommended earlier by the prior art and not by limiting their use to such minimal amounts of 0.5 to 1.5 percent (based on the vehicle) as has been required by the prior art. This invention used the lecithin as a new and decisive factor which maintains a joint state in mixed pigmentation within various dispersions.

This invention uses the lecithins (and modified lecithins) in novelly large amounts in relation to the total amount of dispersed pigmentation, such amounts being between 3.2 and 8 percent based on total pigmentation.

This invention also preferably uses the lecithins in such chemical form that is most suitable for the solvent-type used in the dispersion — that means varying the lecithin form for its use in pigment dispersions in organic solvents or in water dispersions. This can be accomplished because of the specific nature of these lecithin materials. Such phosphatidal materials represent glycerin esters containing two fatty acid groups (of saturated and of unsaturated fatty acids) and one phosphoric acid group, which is reacted with a component from the group of cholines, cephalines and inositols. Accordingly, such lecithin materials are also referred to a phosphatidyl cholines, phosphatidyl ethanolamines and inositol phosphatides. Any or all of these can be present in the crude forms of the plant lecithin materials used in this invention. Besides, since these materials are obtained from oil-producing plants, the crude lecithin materials might be obtained in a form also in which some amount of the plant oil is retained, or where the oil is present as a "carrier" for the lecithin materials.

Because of the complex nature of these materials, it is possible to modify them, for instance by separating out the oil carrier. Even with retention of such carrier, the materials can be modified chemically by peroxide treatment, by hydroxylation etc., and they can be "bleached" into a lighter color. And since, even in the oil free form, the various types of the phosphatides vary in their chemical properties, it is further possible to separate these lecithin materials, for instance, into alcohol-soluble materials (which contain primarily the phosphatidyl cholines) and into alcohol-insoluble materials (which contain primarily the phosphatidyl ethanolamines or cephalines and the inositol phosphatides).

Besides, the fractions which are so being obtained vary also in their molecular size. The alcohol-soluble fraction is lower in molecular size and retains a higher degree of residual reactivity, such as can be utilized in modifying the materials for this invention. And the alcohol-insoluble fraction is higher in molecular size and is further capable of forming (in the lecithin materials) high-molecular formations, which are referred to generally as "micelles". The alcohol-soluble fraction can be present as a "sweller" substance in these micelles. And an equilibrium might exist in such micelles between the number of monomer phosphatides (lecithins) and the lecithin formations containing such number of monomers. Therefore, this invention can utilize the reactive forms of lecithin monomers either in separated form or in larger lecithin formations or even in a state where these formation are still present within an oil carrier.

In this invention the lecithin materials can not only vary between lecithins with and without oil carrier, but they can vary also in respect to the plants from whose seeds they are being produced — all of these types of lecithins are useful in this invention. The lecithins derived from the soybean (preferred) are applicable in this process, as well as the lecithins derived from corn or other oil-producing plants. (Lecithins vary and are affected by the presence of minor constituents, for example, small amounts of sterols, mineral matter, etc.)

To obtain increased stabilization of the lecithin materials in coating, applicants have found that the lecithin materials can be modified effectively by introducing metal groups via heating the lecithins with certain metal chlorides or even more effectively with metal acylates, such as, metal acetates. The metal acetates can be introduced in the lecithin materials directly without freeing them from the oil carrier. The lecithin materials can be purified of certain carbohydrates found in plant lecithins by dissolving the crude lecithin, for instance, in hexane and washing the carbohydrates therefrom by shaking the solution with diluted (eg, 55 percent) ethyl alcohol. Afterwards, the purified oil-carrier lecithin material can be reacted with the metal acetate or organometal acetate (such as, triphenyl lead acetate, dibutyl tin diacetate, and others). The metal groups can even be more readily introduced into oil-carrier-free lecithin, preferably the separated alcohol soluble fraction. All these forms of lecithin can be utilized to obtain a joint stabilization of mixed pigmentation and a joint sedimentation such as allows a full remixing with the vehicles merely by stirring or shaking.

In order to obtain such effects in waterbased vehicles, the lecithin can be made water-dispersible by a treatment with lactic acid or its esters, or propylene glycol or alkyl esters of condensed ethylene glycol.

This invention also includes the novel modified lecithins described herein and the novel paint compositions described herein.

Organic coating materials, having a pigmentation consisting of several pigments of wide variation in specific gravity, possess, on storage, the tendency to show, in settling, an extensive separation of the pigment components. This is influenced, also, by the wetting conditions which prevail in these paint materials. This invention limits or fully avoids such separation of the pigment components by the incorporation of a particular amount of selected lecithin materials, obtained from oil producing plants, and of their modifications and derivatives. The resulting joint sedimentation of the undivided pigment components allows a nearly full restoration of the initial color shades in the paint materials (the settled mixed pigment being a loose and unseparated settling).

Paints which have been stored do not uniformly remix, but applicants have surprisingly found that paints will remix after storage with excellent and durable uniformity when more than conventional amounts of lecithin are used in or introduced into such paints. This is a difference in kind and is unobvious to one ordinarily skilled in the art.

DETAILED DESCRIPTION OF THIS INVENTION

The maintaining of color shades in the storing of paints with mixed pigmentation and the restoring of such shades in the case that a pigment sedimentation has taken place during storage is of importance to the paint industry. When the pigmentation is based on more than one pigment material, the shade will change when one of the components settles at a different rate than another. This takes place not only during extended storage, but is also observed during the drying of heavy film applications. During the period when the application still represents a kind of liquid film, the separation rate of sedimentation of any one of the pigment components can and often does cause color variations in the drying film.

The velocity of the settling for each of the pigment components has been expressed in applying Stokes' law as:

$$V = K \cdot \frac{(d_{Pi} - d_{Bi})r^2}{\eta}$$

$V$ = Velocity
$d_{Pi}$ = Density of the pigment
$d_{Bi}$ = Density of the binder
$r$ = pigment radius
$\eta$ = Viscosity of the paint In mixed pigmentations, therefore, pigments having widely different specific gravities can settle out differently, and they can behave differently in vehicles having different specific gravitities (or densities). Also, pigments of different particle sizes can differ in their settling according to the square of their particle size. After such separated settling has taken place, it is very difficult to restore a complete redispersion of the separated pigment components to produce the initial color shade again.

This invention uses lecithin (preferably soybean lecithin) in certain amounts to produce a considerable increase in maintaining, and in restoring color shades in paints with mixed pigmentation, even when pigments are being used which differ widely in their specific gravitites.

The separation of mixed pigmentation can be influenced by a floating of light weight color components to the surface of the paint (flotation), by a renewed agglomeration of the pigment particles (flocculation), and by the settling of the various pigments according to Stokes' law (sedimentation). The prior art has often recommended the use of different additives to counteract each of these factors individually (see the above prior art discussion). Applications investigated the influence of using these components separately and jointly with the others — applicants found the basic approach of the Kress three-component system resulted in variations of the ultimate dry applied coating, in particular, the influencing on the gloss of the coating.

Applicants investigations showed that the use of separate additives for the three factors of pigment separation continued to remain factors in the properties of the applied coating.

This invention is based upon the unexpected discovery that the introduction of certain amounts of certain lecithins (preferably certain modified) lecithin can limit the flocculation of the pigment components to a co-flucculation of the mixed pigmentation whereafter, by a remixing, the whole combination of pigmentation can again be restored on a durable and uniform basis.

Any lecithin (including modified lecithin) can be used in this invention, but unexpectedly better results are obtained when a lecithin is used which has been modified in certain manners explained below, and far better results are obtained when the soybean lecithin has been modified in a particular way explained below.

The term lecithin in general refers to the wide group of "phosphatides" which exist throughout the animal and plant world and can be described chemically as glycerol derivatives where two glycerol groups are bound to fatty acids and the third one to an aminogroup-carrying phosphoric acid component. Or, more specifically they can be defined as di-glycerides of fatty acids with a third $CH_2OH$ group linked to the choline esters of phosphoric acid. In recent years lecithins have therefore been referred to as "choline phosphoglycerides". (Some of the phosphoric acid groups may be combined with a cephalin or inositol.) For its use in paints, lecithin belongs to the non-ionic surface active agents but it differs from most synthetic surface active agents by the fact that the monomer lecithin is capable of entering a number of chemical shiftings which result in the formation of micellar figurations. Hereby, intermolecular and intramolecular shiftings take place and the large aliphatic groups of the $CH_2$ and CH carbons of the glycerides facilitate this formation of the "micelle". This represents an aggregate compound of a number of molecules, held loosely by secondary forces. In particular, such micelles indicate the introduction of collodial systems where the micelles represent the components of the highest molecular weight constituents as the "disperse phase" in the system and where constituents of lower molecular weight represent the "continuous" or "intermicellar phase". In such formations derived from the plant world, the micelles may contain thousands of molecules and thus have rather high particle weights. Lecithins have a very complex nature.

Soybean lecithins are preferred. When referring to soybean lecithin it is to be understood that there exists a considerable difference between various lecithins, largely — if not altogether — due to the fatty acids which they contain. When soybean lecithin is produced industrially from soybeans the raw lecithin product usually contains in addition to the phosphatides, 35 to 40 percent of oil, which decreases the sensitivity of the lecithin to moisture and oxygen and is therefore supposed to have a stabilizing effect. But the raw lecithin product can further be refined and chemically modified; for example, modified soybean lecithins as "bleached" or "peroxide treated" (hydroxylated) soybean lecithin, or products where the oil fraction is more or less removed, or soybean lecithin in which a treatment with lactic acid (or its esters) has increased the capacity of the oil-free phosphatides to be dispersed in water for use in aqueous emulsions. (How far each of these modifications influences also the capacity of the lecithin to form micellar structures has not been fully established.)

The crude form of the plant-lecithin materials are obtained from oil producing plants, the crude lecithin materials can be obtained in a form also in which some amount of the plant oil is retained, and where as much as 35 to 40 per cent of the oil is retained as an "oil carrier" of the lecithin material. If it is soybean lecithin, the soybean carrier represents a corresponding glycerin ester having three fatty acid groups, two of which correspond to the two fatty acid groups of the soybean lecithin material.

Wittcoff, H., "The Phosphatides", (Americann Chemical Society, Monograph Series), Reinhold Publishing Corporation, New York (1951), page 222, teaches a process for separating the soybean phosphatides into alcohol-soluble and alcohol-insoluble fractions which vary in their properties. The alcohol-soluble fraction in particular is highly reactive and allows the introduction of metal organic groups, or it can be sulfurized for use in rubber/solvent dispersions. This alcohol-soluble fraction is a preferred modified lecithin for use in this invention.

This preferred form of soybean lecithin, and other lecithins, is based on the fact that in the oil-free form two phases are present in the lecithin material. It is possible to separate these as the alcohol-soluble materials, which contain primarily the phosphatidyl choline, and the alcohol-insoluble materials (which contain primarily the phosphatidyl ethanolamines, or "cephalins", and the inositol phosphatides). Therefore, in the Infrared Spectrum, a "granular" oil free lecithin appears as a combined spectrum of both groups, and the separated spectra show main differences in the range between 6 and 7 microns. These fractions vary also in molecular size. The alcohol-soluble fraction is lower in molecular size and higher in the content of monomer matter, and, therefore, retains also a higher degree of residual reactivity. The form in which the lower molecular matter can react, has been explained in different ways. It has been pointed out that the monomer lecithin is capable of entering a number of chemical shiftings (inter-molecular and intra-moleular) which result in the formation of "micellar" figurations — Pfeiffer, J. Ph., "Definitions and Concepts to the Properties of Asphaltic Bitumina", Elsevier (1950), page 8. The alcohol-insoluble fraction is higher in molecular size and is capable of forming, in the lecithin materials, high molecular formations. In this process both fractions together become a part of the micelles in the lecithin. This has also been explained as an aggregate compound of a number of molecules held loosely by secondary forces — Hackh's "Chemical Dictionary", IIIrd Edition, page 536. Such micelles indicate the introduction of collodial systems, where the micelles represent the components of the highest molecular weight constituents as the "disperse phase", and where the constituents of lower molecular weight represent the "continous" or "intermicellar" phase — Pfeiffer, ibid., p. 8. In other papers this author usually referred to the effect of the lower molecular fraction as the "sweller phase" of the colloidal system.

The most preferred embodiment of this invention is the use of a soybean lecithin modified in the way described below — unexpectedly the best results by far are obtained. The soybean lecithin is modified by first separating the lecithin into an alcohol-soluble fraction and a alcohol-insoluble fraction and by then converting (by reaction) the alcohol-soluble fraction into a metal lecithinate compound. The latter step is for example, done by heating the alcohol-soluble fraction with 10 percent of organometal acetate, such as, triphenyllead acetate, (organolec L) or di-butyl tin diacetate (organolec T), until the mixtures turns into a dark, clear brown material. These metal lecithinates alone, or 9:1 or 4:1 mixtures thereof with synthetic surfactants, cause a coflocculation in alkyl paints, whereby when the paint mixture is shaken for one minute, the paint is restored to its initial color shade. The alkyd paint without such additive does not return to its initial shade, and alkyd paint with synthetic surfactant alone returned only partially to the initial color shade.

Other metal lecithins can be used, such as those made by the process of U.S. Pat. No. 2,997,398. The pertinent portions of U.S. Pat. No. 2,997,398 are incorporated herein by reference.

This invention uses from 3.2 to 10 percent, or 1.5 percent of lecithin or modified lecithin, based on the total pigment in the paint or vehicle. Preferably from 6.1 to 8 percent, and most preferably about 6.5 percent, of lecithin or modified lecithin, based on the total pigment in the paint, is used.

All parts, ratios, percentages and proportions in this application are on a weight basis, unless otherwise stated or obvious to one ordinarily skilled in the art.

EXAMPLE 1

A dispersion of pigments having different specific gravities was prepared using the following composition:

| PIGMENT DISPERSION | |
|---|---|
| Red lead oxide (Sp. Gravity 9) | 300 grams |
| Titanium dioxide Rutile (Sp. Gravity 4.2) | 360 grams |
| Alkyd resin solution (70% NV) (long oil soya type with 23% phthalic anhydride) | 330 grams |
| Toluene (solvent) | 100 grams |

The pigment dispersion was ball milled. 50 grams of the pigment dispersion was diluted with 10 grams of toluene (solvent); and another 50 grams of the pigment dispersion was diluted with a solution of 2 grams of soybean lecithin (oil carrier type, hydroxylated) and 8 grams of toluene diluent. When these two freshly prepared paints were applied on white bond paper, the resulting coatings had in both cases a blue filter reflectance of 36.9. After two weeks storage at room temperature, the paint without lecithin has separated into two layers; a light layer whose film application gave a blue filter reflectance of 91.0; and a heavier red bottom layer whose film application gave a blue reflectance of 13.9. The paint containing lecithin showed a single layer settling out whose film appliction gave the blue filter reflectance of 36.9. Upon vigorously shaking (for one minute) the paint without lecithin, the initial reflectance of the film application was not restored; the paint with lecithin, upon similar vigorous shaking, showed a reflectance of 38, or nearly complete recovery of the initial condition.

The reflectance readings of each layer applied to white bond paper was made with a Photovolt Gloss Meter 660.

Similar results as above are obtained when the toluene is replaced with an aromatic or aliphatic diluent or solvent.

EXAMPLE 2

To fifty gram batches of the pigment dispersion of Example 1 were added various compositions in 10 gram amounts. When 2 grams of polyethylene glycol 400 mono oleate (surfactant) and 8 grams of toluene (with no lecithin) were added, the stored and then the re-shaked paint had a reflectance of 53.0, instead of the initial 36.9 due to an incomplete recovery. When 2 grams of mixture (solution) of 9 parts of hydroxylated soybean lecithin and one part of the same surfactant and 8 grams of toluene were added, the joint sedimentation has a blue filter reflectance of 37.1 and showed, upon remixing, nearly complete restoration of the reflectance value of 36.9. When 2 grams of 4 parts of hydroxylated soybean lecithin and one part of the same surfactant and 8 grams of toluene were added, the joint sedimentation had a blue filter reflectance of 39.7 and showed, upon remixing, nearly complete restoration of the reflectance value of 36.9.

So it was found that upon addition of a lower molecular synthetic wetting agent, or surfactant, as diluent to the lecithin, the characteristics of a joint flocculation of the mixed pigmentation, under the effect of the lecithin and their nearly complete re-mixibility, remained unchanged. Similar test with nonyl phenol polyethylene gave similar results. The use of any synthetic non-ionic ester type surfactant, such as, produced from the groups of non-ionic derivatives of certain oils or fatty acid esters, or anionic sodium salts of sulfonic acid, gives similar results of an incomplete re-mixing of the separated sedimentation, when used without lecithin, but nearly fully re-mixing when used as part of a lecithin mixture (solution).

EXAMPLE 3

Using the above-noted Kress paper to incorporate a Bentone besides the lecithin into the mixed pigmented paints, in order to restrict the freedom of motion of the pigment particles, comparative paints were made using Bentone. Bentone 38 was used and is an ion-exchange-treated bentonite. A first test paste (pigment) dispersion) was prepared (as in Example 1) from 300 gm of red lead oxide, 360 gm. of Rutile titanium dioxide, 330 gm. of long-oil, soya, alkyl resin and 100 grams of toluene. An identicial pigment dispersion (second) was made which also contained 5.5 gm. of Bentone 38 (used in a 10 percent dispersion of two parts of methanol and one part of toluene). Tests were made as in Examples 1 and 2 with (a) a mixture of 50 grams of the first pigment dispersion and 10 grams of toluene, (b) a mixture of 50 grams of the second pigment dispersion and 10 grams of toluene, (c) a mixture of 50 grams of the first pigment dispersion, 2 grams of lecithin (standard grade) and 8 grams of toluene, (d) a mixture of 50 grams of the second pigment dispersion, 2 grams of lecithin and 8 grams of toluene, (e) a mixture of 50 grams of the first pigment dispersion and 10 grams of a solution of 4 parts of lecithin and 1 part of nonyl phenol polyethylene (surfactant) and (f) a mixture of 50 grams of the second pigment dispersion and 10 grams of the 4:1 lecithin-surfactant solution. (The lecithin used was a soybean lecithin which still contained about 35% oil carrier, and which has been treated with hydrogen peroxide, or "hydroxylated".) The results showed that, without the presence of lecithin, the incorporation of Bentone did not avoid a complete separation of the pigment components. Using the Bentone jointly with lecithin, or with a 4:1 mixture of lechithin and nonyl phenol polyethylene, prevents the separation of the pigment components. However, after remixing, the paints containing the Bentone and lecithin remained lower in reflectance in each of the three filter readings than when the lecithin had been used without the addition of Bentone. Also, the addition of small amounts of a silicon fluid did not change the characteristics of the test paints obtained with the Bentone.

EXAMPLE 4

Example 1 and Example 2 were repeated, except that the oil-carrier type soybean lecithin was replaced with oil-carrier type corn lecithin. The test results were about the same as in Example 1 and Example 2. (The dried coating was slightly darker than when hydroxylated soybean lecithin was used.)

EXAMPLE 5

Examples 1 and 2 were repeated, except that the oil carriertype lecithin was replaced by a solvent solution of an oil-freed, or granular, lecithin. Joint flocculation and nearly complete remixibility of the sedimentation were observed again, as in Examples 1 and 2.

EXAMPLE 6

The oil-carrier-free lecithin was further separated into an alcohol-soluble lecithin fraction and n alcohol-insoluble lecithin fraction. Each lecithin fraction was tested as in Examples 1 and 2. Using each fraction, it was found that effectiveness of the lecithin in obtaining joint flocculation and remixibility of the sedimentation and of the fluid layer into their initial state was retained (as in Examples 1 and 2).

EXAMPLE 7

Example 1 was repeated, except that the oil-carrier type soybean lecithin was first freed from carbohydrate impurities by dissolving the lecithin in hexane and then washing the solution with 55 percent ethyl alcohol. The purified lecithin resulted in an even higher degree of joint sedimentation and of remixibility of the sedimentation condition into the initial state of reflectance (than occured in Example 1). (The treatment with the diluted alcohol removes impurities without taking out some of the alcohol-soluble lecithin fraction, which would be taken out when 95% alcohol would be used.)

EXAMPLE 8

The test procedure of Example 1 was repeated except that the mixed pigment dispersion used a modified phenolic resin vehicle instead of the oil-based alkyl resin. The modified phenolic resin vehicle was based on a t-butyl phenol formaldehyde resin which was heat-reacted with tungoil and with bodied linseed oil into an air-drying varnish with 25 gal. oil length. Tests were made in Example 1 with (a) a mixture of 50 grams of the pigment dispersion and 25 grams of toluene, (b) 50 grams of pigment dispersion, 25 grams of toluene and 5 grams of lecithin, (c) 50 grams of pigment dispersion, 25 grams of toluene and 5 grams of a solution of lecithin and a minor amount of nonyl phenol polyethylene, and (d) 50 grams of pigment dispersion, 25 grams of toluene and a solution of one part of lecithin and 2 parts of the above surfactant. The most complete uniformity of the sedimentation and of the recovery was obtained with the lecithin paint.

It has been pointed out, earlier, that the velocity of the pigment settling can be expressed, according to Stokes' law, with the specific gravity of the pigment as well as the specific gravity of the vehicle being factors in the equation. By changing the vehicle, from a modified alkyl resin solution, to a modified phenolic resin vehicle, the changes in the vehicle relate not only to the specific gravity of the vehicle but also to the wetting properties and to the surface tension within the binder. Therefore, certain variations in the settling, as well as in the degree of effectiveness of the additives, were to be expected. (The selected varnish vehicle was based on a t-butyl phenol-formaldehyde resin, which was heat-reacted with tung oil and with bodied linseed oil into an air-drying varnish with 25 gal. oil length.) The paints containing hydroxylated lecithin, upon settling of the mixed pigmentation, showed a slight layer formation. That means under the test conditions, complete co-flocculation did not take place, however, the difference in color between the top layer and the sedimentary layer was small compared to the paints without lecithin.

In order to express the relationship in the color between the reflectance readings of the top layer and of the sedimentation layer in a comparative number, a factor was introduced, expressing the reflectance of the applied top layer (applied on white bond paper) divided by the reflectance of the applied sedimentary layer (applied on white bond paper) and this value multiplied by 100. This factor, with the blue filter reflectance readings, for the test paint with hydroxylated lecithin was not much above 100. This means, that the difference in the reflectance readings between the two layer was small. For the paint without additive, it was greater than 300, and, with the paint with synthetic surfactant, it was still greater. The addition of 33 percent of lecithin to the synthetic surfactant did not lower the difference. This indicated that this surfactant increased the wetting of each of the pigment components to a greater degree and increased the pigment separation under these conditions.

These differences appeared, also, in the physical state of the sedimentations, which were hard without additives, quite soft with the surfactant alone or with lecithin, and very soft and readily redispersible with the lecithin as the only additive. The color differences of the layers were apparent also in their film applications on white bond paper. Here, the lecithin materials maintained a state of joint flocculation when used alone, but not when diluted with the synthetic surfactant.

EXAMPLE 9

Similar results to those of Examples 1 and 2 can also be obtained with mixed pigmentation also when the pigment dispersions have a water-based vehicle, such as, latices and similar water-based paint vehicles, provided the lecithin material as been made "water-dispersible". The lecithin is made water-dispersible by hydroxylation by treating the lecithin with agents such as lactic acid and its modifications, and by any other suitable treatment, such as, by the addition of suitable wetting agents or surfactants, more particularily, those which have been ethoxylated. To obtain stability of their mmixed pigmentations such water dispersible lecithin forms can be used by themselves or in mixtures with synthetic wetting agents and dispersants (which are also water dispersible). In using the mixed pigmentation in a water based paint composition, the physical conditions in the paint are changed in the specific gravity as well as in the internal viscosity of the vehicle and its wetting condition.

Soybean lecithin was rendered water dispersible by treatment with lactic acid (the same could be achieved by treatment with esters of lactic acid or with propylene glycol or by alkyl esters of condensed ethylene glycol). The pigment dispersion was obtained from 90 gm. of titanium dioxide (sp. gr. 4.2), 40 gm. of basic lead silicochromate [based on 47 percent lead oxide (sp. gr about 9), 47.6 percent silicon dioxide (sp. gr. about 2) and 5.4 percent chromium dioxide (sp. gr. about 5.4)], 150 gm. of acrylic latex and 50 gm. of water. As in Example 1, the various pigment dispersions were allowed to stand to room temperature. The pigment dispersion (without additive) upon standing formed two layers which differed widely in their reflectance. Upon application to white bond paper, the white paint layer differed from the colored layer, in the blue filter reflectance readings, by 35.5 points. When synthetic wetting agent was added to some of the pigment dispersion, the synthetic wetting agent wetted each of the two pigments to a greater extent, the pigments settled out more from each other, and the difference in the reflectance readings increased to 50 points. When on part of the synthetic wetting agent and two parts lecithin material was added to some of the pigment dispersion, the results were about the same. When the water dispersible lecithin was added to some of the pigment disperions, however, the pigments in the dispersion approached a state of joint flocculation, and the difference in reflectance decreased to 18.5 points.

EXAMPLE 10

The procedure of Example 1 was repeated with modification. A pigment paste was prepared from 9 gm. of synthetic iron oxide, 22 gm of zinc oxide, 40 gm. of methyl ethyl ketone and 30 gm. of benzene (and then ball-milled). A hydroxylated lecithin was first heated with 10% of zinc acetate until the acetic vapours had been driven off and the metal had been introduced into the lecithin material. A first alkyd dispersion was prepared from 100 gm. of long-oil soya-type alkyd resin, 30 gm. of toluene and 2 gm. of cobalt drier (12 percent Co). A second alkyd dispersion was prepared from 92 gm. of the same alkyd resin, 30 gm. of toluene, 2 gm. of the same cobalt drier and 8 gm. of the zinc acetate-modified lecithin. 30 gm., of the pigment dispersion was added to 132 gm. of each of the alkyd dispersions. The behavior of the prepared test paints showed again the full co-flocculation and remixibility of the mixed pigmentation when prepared with the metal group carrying lecithin.

To obtain increased stabilization of the lecithin materials in coatings, it was found that such can be done by modifying them by introducing metal groups. The modification can be accomplished by heating the lecithins with certain metal chlorides, or even, more effectively, with metal acylates, such as metal acetates (such as 5 to 10 percent of zinc acetate). Also they can be heated with organo metal acylate (such as 5 to 10 percent of triphenyl lead acetate, tributyl tin acetate, di-butyl tin di-acetate, and others). The metal acetates can be introduced in the lecithin materials directly without first freeing them from the oil carrier. The materials can be further purified of certain carbohydrate components in the plant lecithin by dissolving the crude lecithin, for instance, in hexane, and washing the carbohydrates therefrom by shaking the solution with diluted (e.g., 55 percent) ethyl alcohol. Afterwards, the purified oil-carrier lecithin materials can be reacted with the metal acetate.

The metal groups can be even more readily introduced into oil-carrier-free lecithin, in particular, into the separated alcohol-soluble fraction. It is especially good to introduce organo metal into such lecithin. By way of example, titanium dioxide and red lead oxide pigmentation were dispersed in a alkyd solution. To 50 grams of this pigment dispersion were added a mixture 2 grams of zinc lecithinate and 8 grams of aliphatic mineral spirits, or a mixture of zinc lecithinate with a synthetic surfactant. There was no separation of the two pigment components. The tests show that the specimens with the pre-purified lecithin base resulted in a looser joint sedimentation than with the zinc lecithinate obtained from the crude lecithin. But, on shaking, all of the samples showed, in their applied films on white bond paper, about identical reflectance readings.

In order to demonstrate that the metal lecithinates do become active components in the vehicle, two organo metal lecithinates were introduced into unpigmented elastomeric polymer dispersions, such as, synthetic rubber dispersions in toluene. Then, from the rubber dispersions without metal lecithinates, and from the same kinds of rubber dispersions containing organo metal lecithinates, the fractions were precipitated which fell out on addition of ether petroleum. These precipitates were compared. Changes took place in the rubber matter, which contained the lecithinate with the organolead modified lecithin and in the organo tin modified lecithin.

EXAMPLE 11

Using the procedure of Example 10, a preparation was used instead which contained lecithin reacted with 10 percent of tributyltin acetate. The organometal modified lecithin which combined the advantage of providing the joint stability for the mixed pigmentation with the advantage of the specific properties of the organometal compound is used. In this way paints with stable mixed pigmentation can be produced which have antimold and antifouling properties.

EXAMPLE 12

In paints having vehicles which are any form of polyhydroxyl alcohol-fatty acid ester type oil or materials containing any form of such oils within their resinous formations (and having or not having mixed pigmentations), lecithins and its modified form can be used to obtain in such vehicles (paints) a joint and stable dispersion of pigmentations also wherein the pigment components differ not as much in their specific gravity as in other physical properties (in particular in their oil absorption).

A mixture of 30 parts of a colored and high priced pigment like zinc yellow (having an oil absorption of 31) and 20 parts of a colorless, but economical extender pigment, like wet ground mica (having an oil absorption of 60) were added to a alkyd vehicle. No separation of the pigment components took place after 3 to 5.5 percent of souble oil-carrier containing soybean lecithin was introduced. The stored suspension was easily restored (after a joint settling of the pigment components during storage) by simply shaking the mixtures — the initial colorshade returned. Without the addition of the lecithin component, the extender pigment settled below the yellow suspended pigmentation and did not remix into the initial colorshade.

EXAMPLE 13

A pigment dispersion was prepared as in Example 1 from 300 grams of red lead, 360 grams of titanium dioxide (rutile), 330 grams of alkyd resin (70 percent solids) and 100 grams of odorless mineral spirits. Batches of the pigment dispersion were admixed with ALCOLEC Z-3 (a chemically modified soybean lecithin manufactured by the American Lecithin Company of Woodside, N.Y.) or ALCOLEC DS (a highly bleached soybean lecithin manufactured by the same company) and odorless mineral spirits (an aliphatic solvent) in the following amounts:

| Paint No. | Paint Composition | Percentage Lecithin In The Paint |
|---|---|---|
| A | 50 grams pigment paste<br>2 grams ALCOLEC Z-3<br>8 grams odorless mineral spirits | 4% on paste, or 6.6% on pigment, or 13% on alkyd (70% NV), or 3.3% on whole paint. |
| B | 50 grams pigment paste<br>1 gram ALCOLEC Z-3<br>8 grams odorless mineral spirits | 2% on paste, or 3.3% on pigment, or 6.5% on alkyd (70% NV), or 1.65% on whole paint. |
| C | 50 grams pigment paste<br>0.5 gram ALCOLEC Z-3<br>8 grams odorless mineral spirits | 1% on paste, or 1.65% on pigment, or 3.25% on alkyd (70% NV), or 0.825% on whole paint. |
| D | 50 grams pigment paste<br>0.25 gram ALCOLEC Z-3<br>8 grams odorless mineral spirits | 0.5% on paste, or 0.825% on pigment, or 1.625% on alkyd (70% NV), on 0.4125% on whole paint. |
| E | 50 grams pigment paste<br>2 grams ALCOLEC bleached DS<br>8 grams odorless mineral spirits | 4% on paste, or 6.6% on pigment, or 13% on alkyd (70% NV), or 3.3% on whole paint. |
| F | 50 grams pigment paste<br>1 gram ALCOLEC bleached DS<br>8 grams odorless mineral spirits | 2% on paste, or 3.3% on pigment, or 6.5% on alkyd (70% NV), or 1.65% on whole paint. |
| G | 50 grams pigment paste<br>3 grams ALCOLEC bleached DS<br>8 grams odorless mineral spirits | 6% on paste, or 9.9% on pigment, or 19.5% (70% NV), alkyd (70%NV), or 4.95% on whole paint. |

The paint samples go from 2 grams ALCOLEC Z-3 in 50 grams paste (with 6.6% of the pigmentation or 3.3% of the total paint) gradually down to 0.25 gram of ALCOLEC Z-3 in 50 grams paste (or 0.825% of pigmentation or 0.4125% of the whole paint).

The following is the result of settling tests:

| Paint No. | Observations |
|---|---|
| A | Settles, but is readily remixable on shaking. Coating very uniform. |
| B | Settles, still readily mixed, but coating streaky. |
| C | Settles, but is gradually shaken into mixture. Coating not regular. |
| D | Settles, still more slowly mixed upon being shaken. Settles again, |

-continued

| Paint No. | Observations |
|---|---|
|  | when applied, before film dries. |
| E | Settles. Well remixable, but coating not as uniform as Paint No. A |
| F | Settles. Upon being shaken, mixes back very slowly. Coating streaky. |
| G | Settles, but well remiscible and gives uniform coating similar as Paint No. A |

The following are the reflectance readings of the applied paints:

| Paint No. | Filter: Green | Amber | Blue | Comments |
|---|---|---|---|---|
| A | 68 | 74 | 59.5 | Readings of the uniform paint. |
| B | 68.5 | 74 | 60.5 | Difference compared to Paint No. A, due to the white streaking. |
| E | 68 | 74 | 60 | Compared to Paint No. A, slight streaking effect due to DS. After longer storage is less recombined than Z-3. |
| F | 68 | 74 | 61.5 | Compared to Paint No. E, higher streaking effect; and against Paint No. B, same as result of changing from Z-3 to DS. |
| C | 68 | 74 | 60 |  |
| D | 72 | 75 | 68 |  |
| G | 68 | 74 | 61 | Lecithin nearly not effective in remixing high amount of white component because percent of lecithin too low. Slightly darker than Paint No. A (in blue filter reading) but uniform. (The color difference might be due to the grade of lecithin). |

There is a difference between the use of hydroxylated Z-3 and bleached regular type DS. The paint with 2 grams lecithin Type DS to 50 grams paste was still a bit streaky; using 3 grams lecithin DS also produced uniform coatings (with lecithin type Z-3 these were obtained with the lower percent of lecithin).

Paint No. A. with about 6.5 percent lecithin (based on the pigment) was by far the most uniform of the applied re-mixed paints with lecithin type Z-3. Paint No. B and Paint No. C decreased gradually in uniformity and Paint No. D (which has lecithin at a level slightly above that taught by the prior art) separated so fast that the paint appeared remixed when it was being applied, but in drying the heavy (red) pigment has already settled out below the lighter white one. The data shows that to achieve the benefits of this invention lecithin is required in higher amounts than the prior art and conventional use. On the other hand, the specimens show that all the paints of the lecithin type Z-3 series continued to dry well despite the higher lecithin amount (up to 6.6 percent based on the pigment). On the other hand, the samples using bleached ALCOLEC DS instead of hydroxylated ALCOLEC Z-3 show that to achieve the full effect of this invention requires somewhat more licithin of such type in order to obtain complete remixing. And the paint having 50 percent more lecithin type DS than with lecithin type Z-3 is dried slower due to the very high amount of lecithin (nearly 10 percent based on the pigment).

Similar results were obtained when benzene was used in place of the odorless mineral spirits.

EXAMPLE 14

A pigment dispersion was prepared as in Example 1 from the ingredients listed in Example 13. Batches of the pigment dispersion were admixed with the alcohol soluble fraction of soybean lecithin and odorless mineral spirits in the following amounts.

| Paint No. | Paint Composition | Percentage Lecithin In the Paint |
|---|---|---|
| H | 50 grams pigment paste<br>2 grams alcohol soluble lecithin fraction<br>8 grams aliphatic solvent (odorless) | 6.6% on pigment,<br>7.2% on vehicle |
| K | 50 grams pigment paste<br>1 gram alcohol soluble lecithin fraction<br>8 grams aliphatic solvent (odorless) | 3.3% on pigment,<br>3.6% on vehicle |
| L | 50 grams pigment paste<br>0.5 gram alcohol soluble lecithin fraction<br>8 grams aliphatic solvent (odorless) | 1.65% on pigment,<br>1.8% on vehicle |
| M | 50 grams pigment paste<br>0.25 gram alcohol soluble lecithin fraction<br>8 grams aliphatic solvent (odorless) | 0.825% on pigment<br>0.9% on vehicle |

After one week's storage the paints were shaken again and applied to white Bond paper.

The following are the reflectance readings of the applied paints:

| Paint No. | Filter: | Blue | Green | Amber | Comments |
|---|---|---|---|---|---|
| H |  | 41 | 60 | 78 | Uniform Film |
| K | (some areas) | 59 | 71 | 87 | Streaky Film |
|  | (other areas) | 64 | 73 | 87 |  |
| L | (some areas) | 59 | 72 | 84 | More streaky |
|  | (other areas) | 66 | 76 | 84 |  |
| M | (some areas) | 59 | 71 | 84 | Very streaky |
|  | (other areas) | 70 | 79 | 84 |  |

Paint No. H (with lecithin at 6.6 percent based on the pigment) redispersed fully and uniformly. Paint No. K (with lecithin at 3.3 percent based on the pigment) showed some appearance of the while layer coming to the top of the mixed and applied paint. Paints No. L and No. M (with still lower lecithin amounts) increased even further in lack of redispersion. In ths invention, the amount of lecithin should be between 3.2 and 8 of the total pigmentation. When the lower amounts shown by the literature (with 0.5 and 1.5 percent based on the vehicle) are used, the advantageous effects of this invention are not achieved.

EXAMPLE 15

A pigment dispersion was prepared as in Example 1 from the ingredients listed in Example 13. Batches of the pigment dispersion were admixed with corn lecithin and odorless mineral spirits in the following amounts.

| Paint No. | Paint Composition | Percentage Lecithin in The Paint |
|---|---|---|
| N | 50 grams pigment paste<br>2 grams corn lecithin<br>8 grams aliphatic solvent (odorless) | 6.6% on pigment,<br>7.2% on vehicle |
| O | 50 grams pigment paste<br>1 gram corn lecithin<br>8 grams aliphatic solvent (odorless) | 3.3% on pigment,<br>3.6% on vehicle |
| P | 50 grams pigment paste<br>0.5 grams corn lecithin<br>8 grams aliphatic solvent (odorless) | 1.65% on pigment,<br>1.8% on vehicle |
| R | 50 grams pigment paste<br>0.25 grams corn lecithin<br>8 grams aliphatic solvent (odorless) | 0.825% on pigment,<br>0.9% on vehicle |

After one week's storage the paints were shaken again and applied to white Bond paper.

The following are the reflectance readings of the applied paints:

| Paint No. | Filter: | Reflectance Readings of The Applied Paints | | | Comments |
|---|---|---|---|---|---|
| | | Blue | Green | Amber | |
| N | | 50 | 66 | 82 | Uniform Film |
| O | (some areas) | 48 | 62 | 79 | Streaky Film |
| | (other areas) | 55 | 67 | 84 | |
| P | (some areas) | 50 | 63 | 78 | More Streaky |
| | (other areas) | 54 | 66 | 84 | |
| R | (some areas) | 45 | 61 | 80 | Very Streaky |
| | (other areas) | 64 | 76 | 85 | |

The lowering of the lecithin amounts decreased the complete redispersion of the settled pigment, and the paint applications became streaky when the lecithin amount had been decreased. In this invention, the amount of lecithin matter used should be between 3.2 and 8 of the total pigmentation. With the lower amounts shown by the literature (such as 0.5 to 1.5 percent of the vehicle) the effects of this invention are not achieved.

What is claimed is:

1. The process of overcoming in a coating composition that includes a fluid vehicle which is compounded with a mixture of powdered or granular solid pigment components, said solid pigment components having different specific gravities, the tendency of said solid pigment components, upon storage, to separate from each other in accordance to their specific gravity, which comprises incorporating lecithin or a modification thereof, said modification having been obtained by hydroxylating or bleaching lecithin, into said coating composition containing said solid pigment components in an amount effective to significantly improve the storage stability of said solid pigment components in said coating composition, said effective amount of said lecithin, of said modification thereof, being 5.5 percent by weight, or more, based on the weight of said solid pigment components, said effective amount being more than the amount of said lecithin, or said modification thereof, required for the optimum wetting and dispersion of said solid components in said coating composition and said coating composition returns to the original color and state said coating composition originally had upon mixing or shaking of said coating composition after a storage period.

2. The process according to claim 1 wherein said coating composition is a paint.

3. The process according to claim 2 wherein said solid pigment components are metal oxides or silicon oxides.

4. The process according to claim 2 wherein said fluid vehicle is a drying coating vehicle.

5. The process according to claim 2 wherein said lecithin is used in the form of a combination of a low-molecular alcohol-soluble fraction thereof and of a higher-molecular alcohol-insoluble fraction thereof.

6. The process according to claim 2 wherein said lecithin is used in a crude form, which retains some of the oil matter of the plant seeds from which said lecithin is obtained, said oil substance acting as a carrier for the phosphatides in the lecithin.

7. The process according to claim 6 wherein said oil carrier part in said crude lecithin has been chemically modified by hydroxylation, or bleaching.

8. The process according to claim 2 wherein at least two of said solid pigment components also have different color, this process also overcomes the tendency of such at least two said solid components to separately settle which preserves the color of said paint.

9. The process according to claim 2 wherein said paint is an emulsion form and wherein said lecithin has first been modified into a more water dispersible form and then is used in said emulsion thereby avoiding separation of said solid pigment components.

10. The process according to claim 2 wherein said lecithin is used in combination with a minor amount of a synthetic surfactant, such not decreasing the effectiveness of said lecithin in overcoming the tendency of said solid pigment components to separate according to their specific gravity.

11. The process according to claim 2 wherein said lecithin is a soybean lecithin or corn lecithin and wherein said lecithin is used in a form which consists of at least two mixtures of two fractions, one being lower molecular and alcohol soluble and the other higher molecular and alcohol insoluble.

12. The process according to claim 2 wherein said amount of said lecithin, of said modification thereof, is between 5.5 and 10 percent by weight based on the weight of said solid pigment components.

13. The process according to claim 2 wherein said amount of said lecithin, or said modification thereof, is between 6.1 and 8 percent by weight based on the weight of said solid pigment components.

14. The coating composition that comprises a fluid vehicle which is compounded with a mixture of powdered or granular solid pigment components, and contains lecithin, or a modification thereof, said modification having been obtained by hydroxylation or bleaching lecithin, said lecithin, or said modification thereof, being present in an amount effective to significantly improve the storage stability of said pigments components, said effective amount, of said lecithin, or said modification thereof, being 5.5 percent by weight, or more, based on the weight of said solid pigment components, said effective amount of said lecithin, or said modification thereof, being more than the amount of said lecithin or said modification thereof, required for the optimum wetting and dispersion of said solid pigment components in said coating in said coating composition, said solid pigment components having different specific gravities, the tendency of said solid pigment components, upon storage, to separate from each other in accordance to their specific gravity, and said coating composition returns to the original color and state said coating composition originally had upon mixing or shaking of said coating composition after a storage period.

15. The coating composition of claim 14 wherein said coating composition is a paint.

16. The process according to claim 15 wherein said amount of said lecithin, or said modification thereof, is between 5.5 and 10 percent by weight based on the weight of said solid pigment components.

17. The process according to claim 15 wherein said amount of said lecithin, or said modification thereof, is between 6.1 and 8 percent by weight based on the weight of said solid pigment components.

* * * * *